United States Patent [19]

Hegler et al.

[11] Patent Number: 4,513,787
[45] Date of Patent: Apr. 30, 1985

[54] CORRUGATED SHEATHING HOSE

[75] Inventors: Wilhelm Hegler, Goethestrasse 2, D-8730 Bad Kissingen; Ralph-Peter Hegler, Bad Kissingen, both of Fed. Rep. of Germany

[73] Assignee: Wilhelm Hegler, Bad Kissingen, Fed. Rep. of Germany

[21] Appl. No.: 545,744

[22] Filed: Oct. 26, 1983

[30] Foreign Application Priority Data

Dec. 16, 1982 [DE] Fed. Rep. of Germany ....... 3246594

[51] Int. Cl.³ .............................................. F16L 11/12
[52] U.S. Cl. .................................. 138/166; 174/68 C; 174/DIG. 11; 138/128; 138/168
[58] Field of Search ................ 138/99, 128, 151, 156, 138/166, 168; 174/68 C, DIG. 11

[56] References Cited

U.S. PATENT DOCUMENTS

| Re. 24,613 | 3/1959 | Hageltorn | 138/128 X |
|---|---|---|---|
| 2,198,415 | 4/1940 | Quarnstrom | 138/168 |
| 2,558,367 | 6/1951 | Madsen | 138/128 X |
| 3,038,205 | 6/1962 | Plummer | 138/166 X |
| 4,422,478 | 12/1983 | Pentney et al. | 138/168 |

FOREIGN PATENT DOCUMENTS

| 1218574 | 12/1966 | Fed. Rep. of Germany . |
| 3100944 | 8/1982 | Fed. Rep. of Germany . |
| 3118932 | 8/1982 | Fed. Rep. of Germany . |
| 3151845 | 9/1982 | Fed. Rep. of Germany . |

Primary Examiner—James E. Bryant, III
Attorney, Agent, or Firm—Browdy and Neimark

[57] ABSTRACT

A plastic corrugated sheathing hose adapted for electric cable installation and producible in one continuous operation, includes a longitudinal slit along its side. Each edge of the hose adjacent the slit is complementarily configured to form a detent or snap-locking closure releasably engageable in overlapping relationship. After insertion of a cable through the sheathing hose slit, closure of the hose is accomplished by pressing overlapped complementarily configured together. Closure of the hose in this manner results in a substantially gas-tight and waterproof cable enclosure accomplished in one operation with the inlaying of the cable.

14 Claims, 6 Drawing Figures

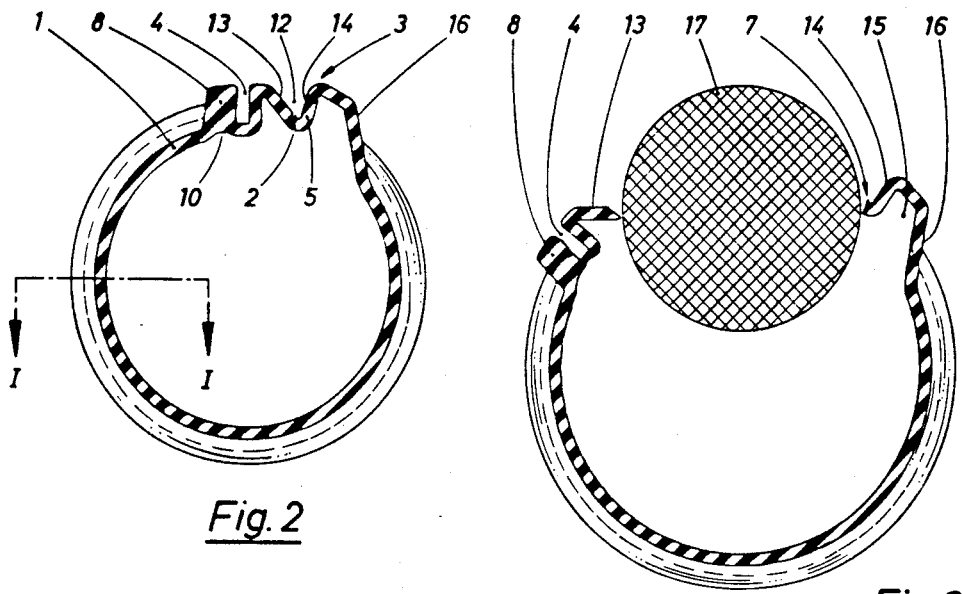
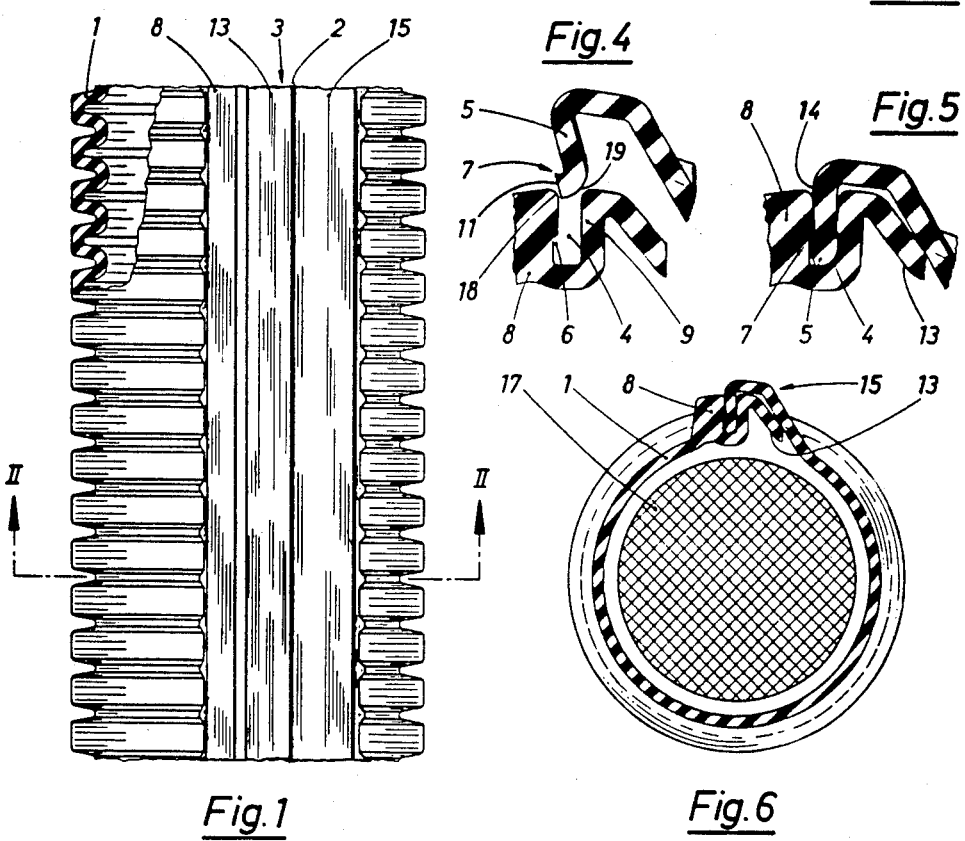

CORRUGATED SHEATHING HOSE

FIELD OF THE INVENTION

The present invention relates to a plastic corrugated sheathing hose, adapted for electric cable installation, and having a longitudinal slit on its side.

BACKGROUND OF THE INVENTION

Plastic corrugated sheathing hoses per se have long been known (for instance, from German Pat. No. 1 218,574) and are used successfully in the most various ways in electric installation, for instance in homes or for outdoor lines buried underground. It is also known per se to provide such corrugated sheathing hoses with a longitudinal slit on the side, in order to be able thereby to wrap laid cable segments with it or to make repairs of damaged segments of corrugated hose.

From German laid-open application DE-OS No. 31 00 944, a flexible protective hose having a longitudinal slit on the side is known, which is conceived particularly for repair purposes. This protective hose is supposed to have the greatest possible bending elasticity and is therefore provided with slits transverse to the longitudinal axis as well. This provision, however, necessitates wrapping the flexible hose, after installation, with a self-welding adhesive tape or the like, in order to attain the desired waterproofing and gas-tightness.

SUMMARY OF THE INVENTION

It is accordingly a principal object of the present invention to provide a corrugated sheathing hose which is capable of wrapping or enclosing relatively long lengths of already-laid cable, with the wrapping process being accomplished rapidly and easily while attaining reliable sealing of the corrugated sheathing hose. The corrugated sheathing hose of the present invention is economically produced in one injection operation.

This object is attained by providing the corrugated sheathing hose as generally defined above with a longitudinal slit along its side with adjacent edges of the hose at the slit being complementarily configured to coact, when placed in overlapping relationship, as a releasably engageable snap-locking closure or detent for the slit. It thereby becomes possible to pull the corrugated sheathing hose off a storage drum at a high working speed, wrap it around the already-laid cable, and in the same operation close the snap closure, for instance using a closure-operating device. Sheathing of the cable and sealing it against the entry of gas and water, the latter assured by the snap closure, are thus accomplished conveniently. The snap closure embodied along the longitudinal slit furthermore has a stabilizing effect in that tensile and crushing stresses, to which corrugated hoses are inherently vulnerable, are absorbed. It is thereby assured, even in the event of machine laying over relatively long distances, that tensile stresses which could damage the corrugated sheathing hose will not arise.

In principle, a detent or snap closure device includes at least one recess and a matching protrusion, and the inherent elasticity of the plastic that is used is particularly advantageous in snapping the closure open and closed.

By providing that the recess and protrusion for the snap closure be continuous in the longitudinal direction, it is possible to attain a tight connection.

By providing a nose on the protrusion and a matching undercut on the recess, a connection which locks not only as a result of the exertion of force but also by positive engagement is produced, and the detent nose acts both as a kind of mechanical barb and as a sealing lip.

The invention further provides a longitudinal recess of asymmetrical, V-shaped cross section, in which the longitudinal slit is disposed toward the tip of the V, offset in the direction of the relatively flatter arm of the V, in order to form the detent nose. As a result, the particular advantage is attained that corrugated sheathing hoses ready for processing can be produced, including the longitudinal slit, in one continuous operation. With the positioning of the slit in accordance with the invention, it is possible on the one hand to select a relatively simple profile, yet on the other hand to attain high-quality locking and sealing.

The longitudinal slit is offset in accordance with the invention such that an acute angle at the detent nose is attained, thus assuring that during the locking process the nose will reliably come to rest in the undercut. At the same time, the angle between the cut edge of the nose and the inside of the wall of the longitudinal recess is relatively wide, so that as this slit area passes along the cable which is to be wrapped, damage to functionally important parts is substantially avoided.

A longitudinal bulge of U-shaped cross section adjacent the hose is also provided by the invention which furnishes a certain amount of clearance for the elasticity of the detent protrusion, so that elevations formed by the detent recess and the longitudinal recess parallel thereto fit over one another, thereby compensating for manufacturing tolerances in such a way that reliable locking in of the detent protrusion in the detent recess is possible in every case.

Further in accordance with the present invention, the outer side wall of the detent recess is embodied as thicker than the inner wall thereof, and being accordingly stiffer, acts as an abutment for the more elastic detent protrusion.

Further characteristics, advantages and details of the invention will become apparent from the ensuing description of a preferred exemplary embodiment, taken in conjunction with the drawings.

BRIEF DESCRIPTION OF THE DRAWINGS

FIG. 1 is a plan view of a segment of a corrugated sheathing hose according to the invention, shown partially in section, and taken along the line I—I of FIG. 2;

FIG. 2 is a cross section taken through the trough of one corrugation, along the line II—II of FIG. 1;

FIG. 3 is a view corresponding to FIG. 2 but with the hose spread apart and showing an electrical cable being introduced;

FIG. 4 is a view again corresponding to FIG. 2 on an enlarged scale, showing the detent mechanism prior to being locked;

FIG. 5 is a view corresponding to FIG. 4, seen after locking has taken place; and FIG. 6 is a view corresponding to FIG. 2, after locking has taken place and with the cable enclosed.

DESCRIPTION OF THE PREFERRED EMBODIMENT

In FIG. 1, a corrugated sheathing hose is shown, which has groove-like troughs and annular protrusions in succession. Corrugated sheathing hoses of this type can be produced according to a method and using an apparatus such as are known, for instance, from German laid-open application DE-OS No. 31 18 932. As can be seen from the portion of the drawing shown in section, the wall 1 has a substantially uniform thickness over its entire length. As a result, while the hose is very strong, great flexibility is attained.

The corrugated sheathing hose according to the present invention is distinguished from known hoses of its type by the provision of a longitudinal slit 2. At either side of, and adjacent, the slit a detent or snap locking closure 3 is disposed. This closure 3 substantially includes a detent recess 4 extending in the longitudinal direction and a detent protrusion 5, also of longitudinal extent, which can be introduced into the detent recess 4.

As seen particularly in FIG. 4, the detent recess 4 is formed by opposing side walls 8 and 9. Side wall 8, which is relatively thick, and thus relatively sturdy, includes an undercut 6. A nose 7 is correspondingly provided on the detent protrusion 5 for engagement with the undercut when detent 5 is fully inserted in recess 4. The opposing side wall 9 of the detent recess 4 is slighter in thickness, so that upon the introduction of the detent protrusion 5 into recess 4, the side wall 8 remains rigid, while the detent recess 4 opens as a result of deformation of the side wall 9. This deformation is further facilitated by an indentation 10 provided on the underside of the side wall 8.

Referring again to FIG. 2, it is seen that the longitudinal slit 2 is provided by cutting wall 1 in a direction offset with respect to a radial direction of the corrugated sheathing hose. In so doing, the cut face of detent nose 7 and the outer surface of the wall 1 form an acute angle, while a relatively obtuse angle is formed between the cut face 11 and the inner surface of wall 1.

The longitudinal slit 2 is disposed in a longitudinal recess 12 of V-shape, which is asymmetrical in such a way that one arm 13 of the V takes a relatively flatter course while the other arm 14 of the V is relatively more steeply inclined. The longitudinal slit 2 is located not precisely in the trough of the V-shaped recess 12, but rather offset relative thereto toward the flatter arm 13 of the V. As a result of this disposition of the slit 2, the detent nose 7 is produced in the above-described angular relationship in the course of the initial making of the slit 2.

The steeper arm 14 of the V is continued in the form of a bulge 15 of U-shaped cross section. The arm 16 of the U-shaped bulge 15 opposite arm 14 then merges at a relatively flat angle with the wall 1.

After being produced and after the longitudinal slit 2 has been made, the corrugated sheathing hose according to the present invention has the cross-sectional shape shown in FIG. 2. In order to insert a cable 17, the corrugated sheathing hose is spread open by pulling arms 13 and 14 of the V apart, thus widening the slit 2; this may be accomplished using a closure-operating device. The cable 17 can then, as shown in FIG. 3, be introduced, whereupon the end of the arm 13 and the obtuse lower end of the detent nose 7 slid along the cable as the cable is being continuously laid into the hose. Any wear that may occur on the end of the arm 13 or on the obtuse lower part of the detent nose 7 is not at all critical, since these parts do not play any part in effecting locking and sealing.

Once the cable 17 has been placed in the corrugated sheathing hose, the slit 2 is closed by locking of the closure. This operation is shown in particular detail in FIGS. 4 and 5. From FIG. 4 it is apparent that smooth, problem-free introduction of the detent protrusion 5 into the detent recess 4 is possible because of the rounded upper outer edge 18 of the detent recess 4 and the rounded outer lower edge 19 of the detent protrusion 5. During this operation, the side wall 9 is bent elastically outwardly away from side wall 8 and the detent nose 7 engages the undercut 6, whereupon the deflected side wall 9, because of its inherent elasticity, returns to its undeflected position in a direction away from its outset position. In the latched state, as shown in FIG. 5, the arm 13 rests on the inside of the arm 16 and presses elastically against it, as a result of which the pressure exerted in the upper area of the detent recess 4 is increased and the sealing effect still further improved. This is reinforced by the geometry of the lower end of the detent protrusion 5. The slit 2 is thereby reliably bridged over and sealed from the outside.

It is to be understood that the foregoing text and drawings relate to an embodiment of the invention given by way of example but not limitation. Various other embodiments and variants are possible within the spirit and scope of the invention.

What is claimed is:

1. A corrugated sheathing hose of plastic, intended for electric installation, having a longitudinal slit along its side, comprising:
    means, disposed along the longitudinal slit, for releasably connecting the two edges of the hose adjacent the slit, said connecting means defining a snap-locking closure including a detent recess which is continuous in the longitudinal direction and a corresponding detent protrusion, said detent protrusion having a detent nose disposed thereon and said detent recess including a corresponding undercut, said connecting means including opposing side walls, said side walls defining a longitudinal recess therebetween having an asymmetrical V-shape, said slit being located near, but offset from, the lowermost portion of said recess thereby forming said detent nose.

2. A corrugated sheathing hose as defined in claim 1, wherein the inclination of one of said side walls of said recess relative to said lowermost portion is greater than the inclination of the other side wall, and said slit is offset from said lowermost portion in the direction of said other side wall.

3. A corrugated sheathing hose as defined by claim 1, wherein said longitudinal slit is disposed in said hose in a direction inclined relative to a radial direction of said hose such that the face of said detent nose at said slit forms an acute angle with the outer surface of the longitudinal recess.

4. A corrugated sheathing hose as defined by claim 2, wherein an adjoining longitudinal bulge of approximately U-shaped cross section is disposed between said one side wall and said hose outer surface.

5. A corrugated sheathing hose as defined by claim 3, wherein an adjoining longitudinal bulge of approximately U-shaped cross section is disposed between said one side wall and said hose outer surface.

6. A corrugated sheathing hose as defined by claim 1, characterized in that one of the side walls defining said detent recess is thicker in cross section than the other of said detent recess side walls.

7. A corrugated sheathing hose as defined by claim 2, characterized in that one of the side walls defining said detent recess is thicker in cross section than the other of said detent recess side walls.

8. A corrugated sheathing hose as defined by claim 3, characterized in that one of the side walls defining said detent recess is thicker in cross section than the other of said detent recess side walls.

9. A corrugated sheathing hose as defined by claim 1, wherein said hose and connecting means comprise a unitary construction.

10. A corrugated sheathing hose as defined by claim 4, wherein said hose and connecting means comprise a unitary construction.

11. A corrugated sheathing hose as defined by claim 5, wherein said hose and connecting means comprise a unitary construction.

12. A corrugated sheathing hose as defined by claim 6, wherein said hose and connecting means comprise a unitary construction.

13. A corrugated sheathing hose as defined by claim 7, wherein said hose and connecting means comprise a unitary construction.

14. A corrugated sheathing hose as defined by claim 8, wherein said hose and connecting means comprise a unitary construction.

* * * * *